United States Patent
Angrish et al.

(10) Patent No.: US 8,949,142 B1
(45) Date of Patent: Feb. 3, 2015

(54) MOBILE PAYMENTS INTEGRATED WITH A BOOKING SYSTEM

(71) Applicant: OpenTable, Inc., San Francisco, CA (US)

(72) Inventors: Rohan Angrish, Mumbai (IN); Rishi Deshpande, Mumbai (IN); Kashyap Deorah, Mumbai (IN); Tapan Pandita, Mumbai (IN); Ulhas Mandrawadkar, Mumbai (IN); Keshav Krity, Mumbai (IN); Sanjay Dalsania, Mumbai (IN); Abhay Kumar, Mumbai (IN)

(73) Assignee: OpenTable, Inc., San Francisco, CA (US)

( * ) Notice: Subject to any disclaimer, the term of this patent is extended or adjusted under 35 U.S.C. 154(b) by 0 days.

(21) Appl. No.: 14/186,120

(22) Filed: Feb. 21, 2014

(30) Foreign Application Priority Data

Dec. 19, 2013 (IN) ............................ 1437/KOL/2013

(51) Int. Cl.
*G06Q 30/00* (2012.01)
*G07F 19/00* (2006.01)
*G06Q 20/20* (2012.01)
*G06Q 20/32* (2012.01)

(52) U.S. Cl.
CPC ............ *G06Q 20/202* (2013.01); *G06Q 20/322* (2013.01)
USPC ............................................. 705/15; 705/34

(58) Field of Classification Search
None
See application file for complete search history.

(56) References Cited

U.S. PATENT DOCUMENTS

| | | | |
|---|---|---|---|
| 7,069,228 B1 | 6/2006 | Rose et al. | |
| 8,224,700 B2 * | 7/2012 | Silver | 705/15 |
| 2005/0267787 A1 | 12/2005 | Rose et al. | |
| 2006/0095434 A1 | 5/2006 | McCullough et al. | |
| 2008/0010105 A1 | 1/2008 | Rose et al. | |
| 2008/0077454 A1 | 3/2008 | Shepherd et al. | |
| 2008/0284562 A1 | 11/2008 | Arthurs et al. | |
| 2010/0082481 A1 | 4/2010 | Lin et al. | |
| 2011/0246247 A1 | 10/2011 | McCullough et al. | |
| 2012/0173310 A1 | 7/2012 | Groetzinger et al. | |
| 2012/0215573 A1 | 8/2012 | Sussman et al. | |
| 2013/0013350 A1 | 1/2013 | McCullough et al. | |

OTHER PUBLICATIONS

Miller, Bryan, wsj.com, "How Mobile Technology is Changing the Way We Dine Out", dated Oct. 25, 2013, 6 pages.

* cited by examiner

*Primary Examiner* — Ryan Zeender
*Assistant Examiner* — Denisse Ortiz Roman
(74) *Attorney, Agent, or Firm* — Hickman Palermo Truong Becker et al LLP

(57) ABSTRACT

In an embodiment, a data processing method comprises, using a merchant booking computer, associating a reservation record with a location identifier, wherein the reservation record comprises a user identifier; using a service provider computer system, matching a transaction ticket stored in a point-of-sale (POS) computer of a merchant to the location identifier of the reservation record, based upon obtaining one or more POS data values from the POS computer, and obtaining ticket data specifying one or more items in the transaction ticket; based upon the user identifier and a user account that associates the user identifier with a mobile computing device identifier, communicating the ticket data to a mobile computing device; receiving, from the mobile computing device, a request to pay a payment amount based upon the ticket data; requesting a payment gateway computer to initiate a payment transaction in which user payment account data associated with the user account identified as payer and in which a merchant account associated with the merchant is identified as beneficiary.

30 Claims, 10 Drawing Sheets

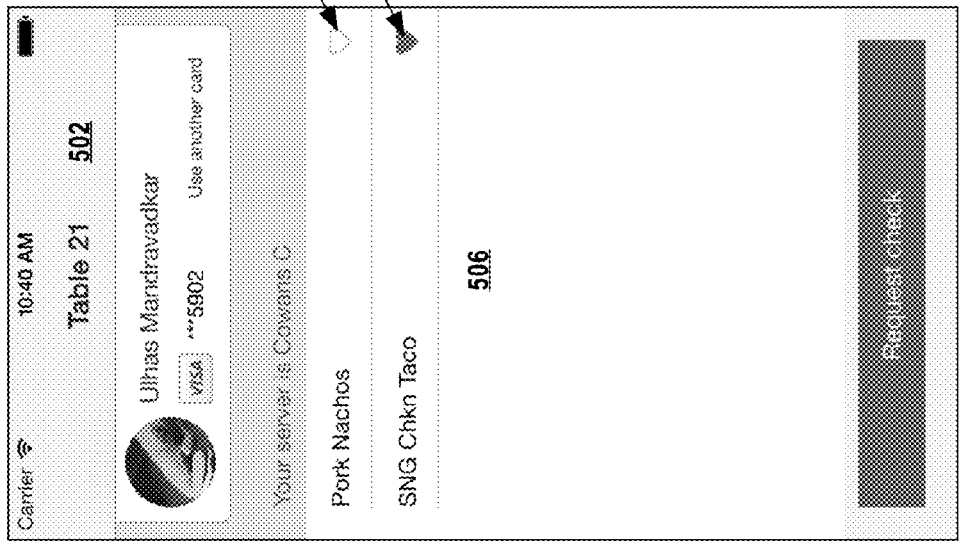
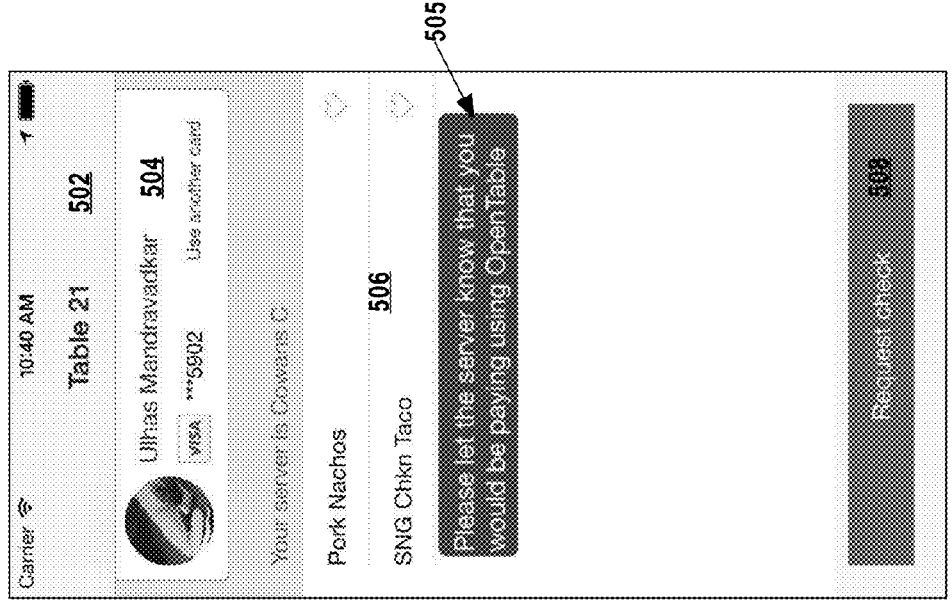

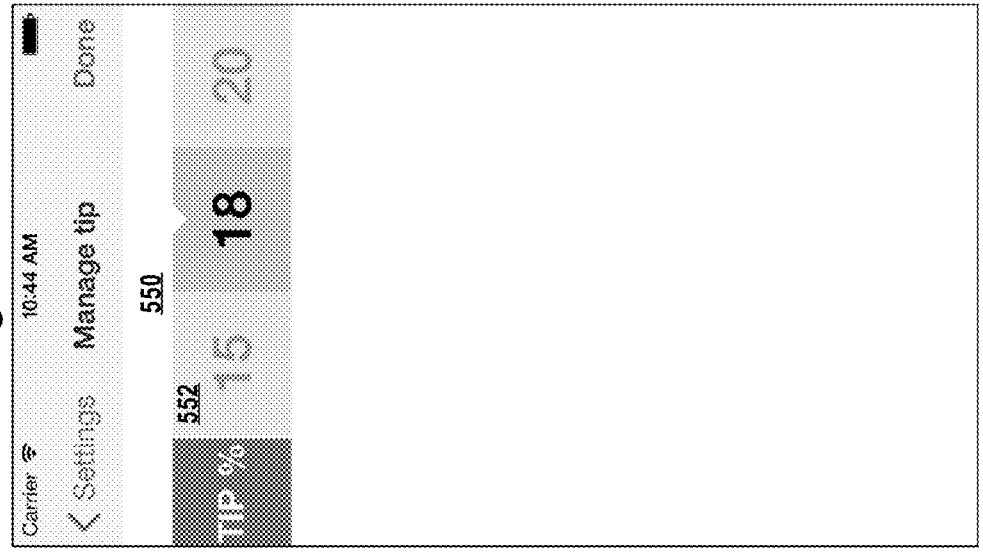
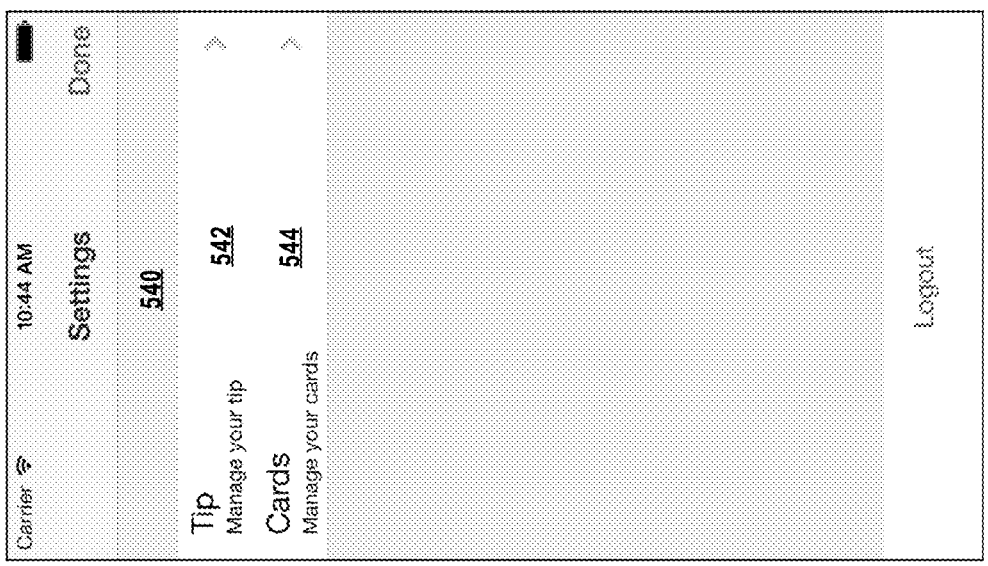

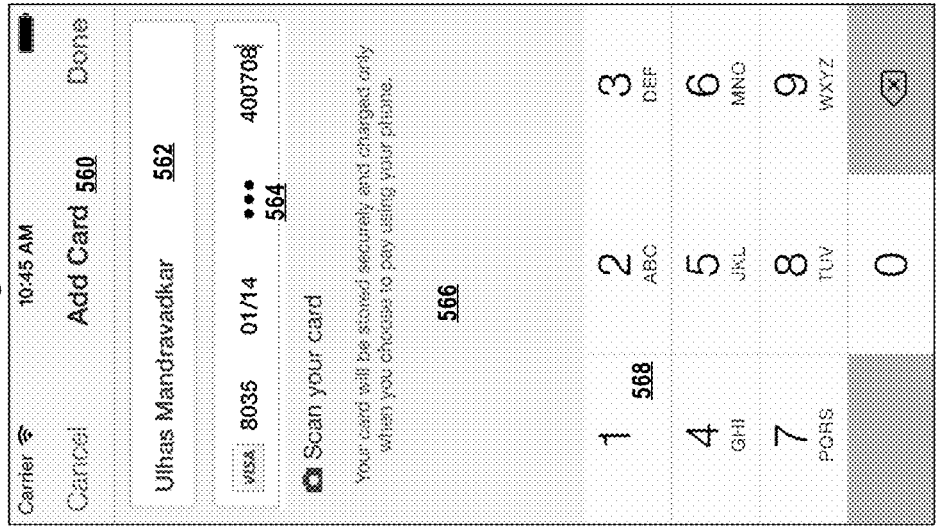
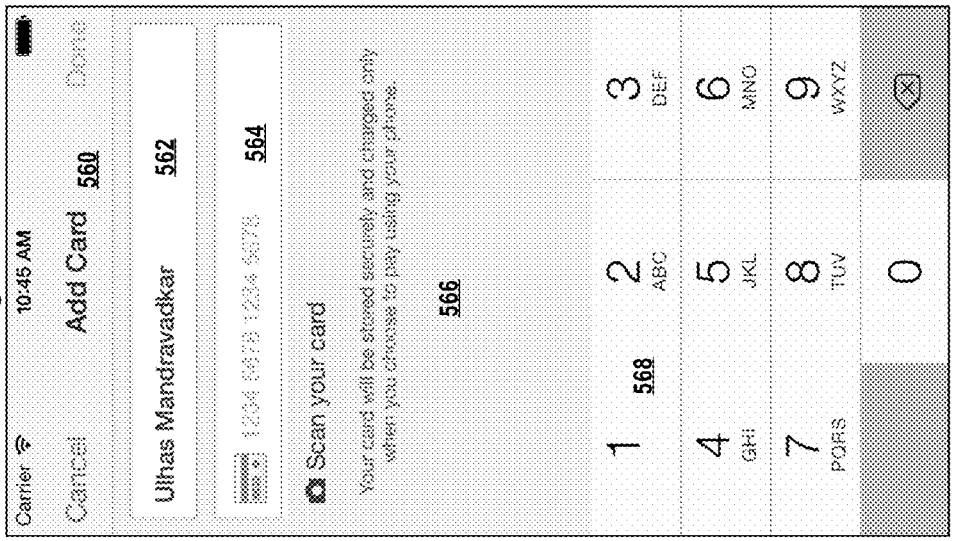

US 8,949,142 B1

MOBILE PAYMENTS INTEGRATED WITH A BOOKING SYSTEM

BENEFIT CLAIM

This application claims the benefit under 35 USC 119 of India application 1437/KOL/2013, filed 12 Dec. 2013, the entire contents of which are hereby incorporated by reference for all purposes as if fully set forth herein.

FIELD OF THE DISCLOSURE

The present disclosure generally relates to data processing in the field of electronic payments. The disclosure relates more specifically to computer-implemented techniques for managing payments for experiences, such as restaurant dining, in coordination with a booking system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Settlement of bills at the end of service can be time-consuming and inconvenient for customers of restaurants or other entities. For example, when diners complete a meal, typically they wish to leave the restaurant relatively rapidly, but the need to interact with restaurant service staff to complete payment can interpose delays. In particular, diners who pay using payment cards such as credit cards or debit cards typically must interact with service staff at least two and often three times in order to receive the bill, present a payment card, and receive a receipt specifying a completed payment. If the bill or receipt contains an error, then additional interactions may be necessary. Similar issues can arise in the context of payment for experiences other than restaurant diners.

SUMMARY

The appended claims may serve as a summary of the invention.

BRIEF DESCRIPTION OF THE DRAWINGS

In the drawings:

FIG. 5A, FIG. 5B, FIG. 5C, FIG. 5D, FIG. 5E, FIG. 5F, FIG. 5G, FIG. 5H, FIG. 5J, FIG. 5K illustrate example screen displays that a mobile app may generate and display using a mobile computing device such as a smartphone in connection with payment functions.

DETAILED DESCRIPTION

Figure 1:
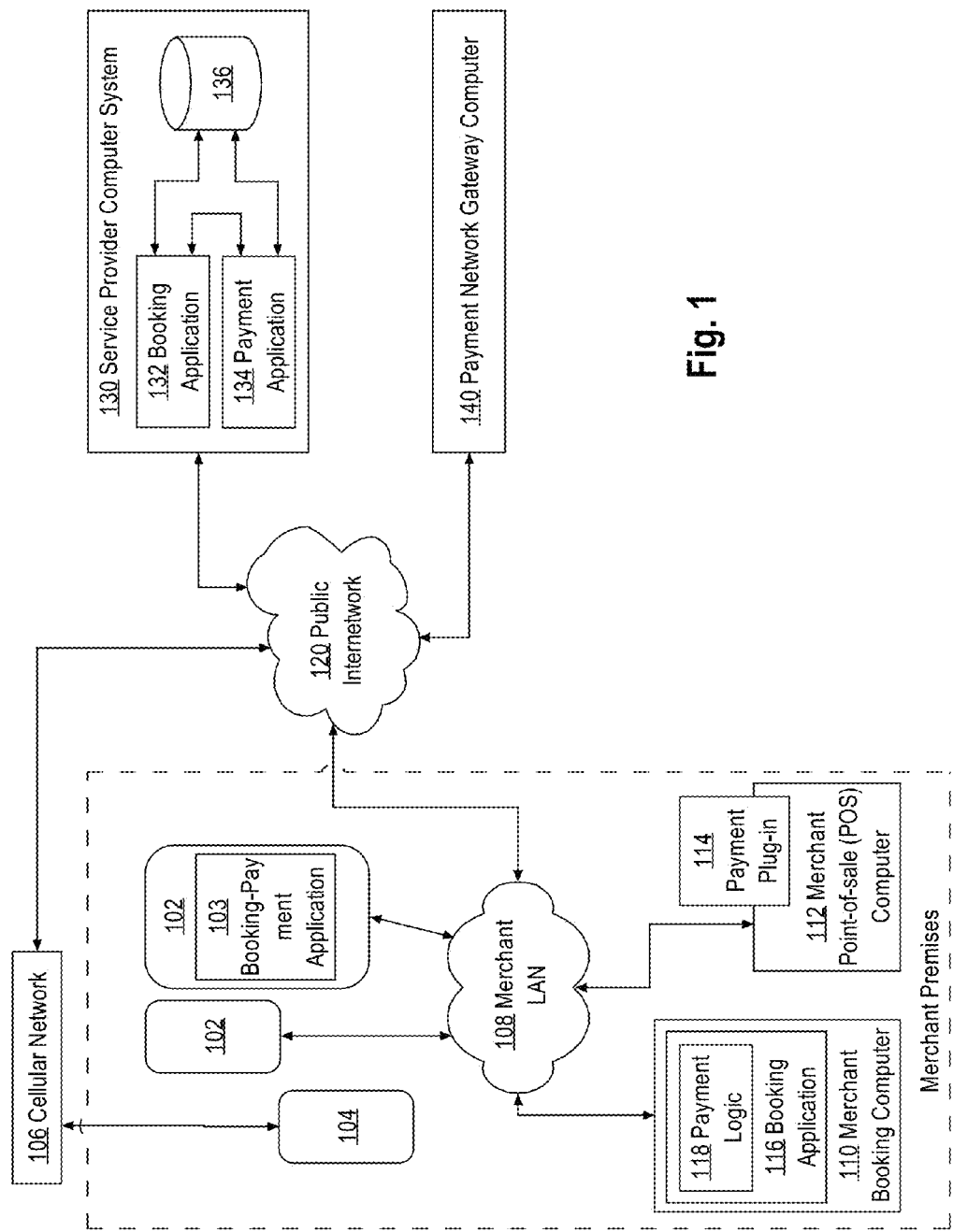
FIG. 1 illustrates a networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

Various embodiments encompass the subject matter of the following numbered clauses:

1. A data processing method comprises using a merchant booking computer, associating a reservation record with a location identifier, wherein the reservation record comprises a user identifier; using a service provider computer system, matching a transaction ticket stored in a point-of-sale (POS) computer of a merchant to the location identifier of the reservation record, based upon obtaining one or more POS data values from the POS computer, and obtaining ticket data specifying one or more items in the transaction ticket; based upon the user identifier and a user account that associates the user identifier with a mobile computing device identifier, communicating the ticket data to a mobile computing device; receiving, from the mobile computing device, a request to pay a payment amount based upon the ticket data; requesting a payment gateway computer to initiate a payment transaction in which user payment account data associated with the user account identified as payer and in which a merchant account associated with the merchant is identified as beneficiary.

2. The method of clause 1 comprising requesting the POS computer to provide ticket data for a transaction ticket of the POS computer having a POS location identifier that matches the location identifier in the reservation record.

3. The method of clause 1 comprising: creating and storing a reservation completion time value in association with the reservation record at approximately a time of associating the location identifier; requesting the POS computer to provide ticket data for a transaction ticket of the POS computer having a ticket time value that is closest to the reservation completion time value.

4. The method of clause 3 wherein the reservation completion time value represents a seating time at which a party is seated at a table specified by the location identifier.

5. The method of clause 1 comprising: using the service provider computer system, requesting the POS computer to provide ticket data for a transaction ticket of the POS computer having a POS location identifier that matches the location identifier in the reservation record; in response to failing to obtain ticket data for a transaction ticket of the POS computer having a POS location identifier that matches the location identifier in the reservation record, requesting the POS computer to provide ticket data for a transaction ticket of the POS computer having a ticket time value that is closest to the reservation completion time value of the reservation record; in response to failing to obtain ticket data for a transaction ticket of the POS computer having a ticket time value that is closest to the reservation completion time value of the reservation record, communicating to the mobile computing device a request to identify a location.

6. The method of clause 1 comprising: receiving, from the mobile computing device, a device location value specifying a then-current geographic location of the mobile computing device; based on a stored location table that associates location identifier values with item geographic location values, comparing the device location value to the item geographic location values and selecting a particular location identifier value that is associated with a particular item geographic location value that is closest to the device location value; requesting the POS computer to provide ticket data for a transaction ticket of the POS computer having a POS location identifier that corresponds to the particular location identifier value.

7. The method of clause 1 wherein each of the location identifier and the POS location identifier specifies a table of a restaurant, and wherein the merchant is a restaurant.

8. The method of clause 1, comprising: using a booking application of the service provider computer system, receiving a reservation confirmation message from a mobile computing device that confirms a reservation request for a restaurant reservation that comprised a restaurant name, date, time, and party size; using the merchant booking computer: receiving from the reservation computer the date, time and party size of the restaurant reservation; storing the date, time and party size in association with the reservation record; communicating, to the reservation computer, the location identifier and the ticket data in association with the user identifier.

9. The method of clause 1 comprising: obtaining, from the payment gateway computer, a charge completion message specifying successful payment using a payment card number associated with the user account; creating and sending, to the mobile computing device, an electronic receipt that specifies at least a portion of the ticket data and the payment amount.

10. The method of clause 1, comprising: automatically receiving one or more ticket item updates from the POS computer in response to addition, in the POS computer, of one or more ticket items to the transaction ticket; in response to receiving one or more of the ticket item updates, sending the ticket item updates to a reservation computer, wherein the reservation computer performs the communicating, receiving and requesting as recited in clause 1.

11. The method of clause 10, comprising initiating an HTTP long polling request to the POS computer that specifies the transaction ticket and includes a request for the one or more ticket items.

12. The method of clause 1, comprising: receiving, from the mobile computing device, an acknowledgment of receiving the ticket data; in response to the acknowledgment, causing renaming the transaction ticket in the POS computer using a new name that indicates using mobile payment.

13. The method of clause 12, comprising causing the POS computer to display the new name.

14. The method of clause 12, comprising causing the POS computer to display the transaction ticket using a distinctive appearance that indicates using mobile payment.

15. A data processing method comprising: using a booking application at a service provider computer system, receiving a reservation confirmation message from a mobile computing device that confirms a reservation request for a restaurant reservation that comprised a restaurant name, date, time, and party size; using an electronic reservation book (ERB) computer: receiving from the service provider computer system the date, time and party size of the restaurant reservation; storing the date, time and party size in association with a reservation record; using the ERB computer, associating a reservation record with a table number, wherein the reservation record comprises a user identifier; communicating, to the service provider computer system, the location identifier in association with the user identifier; using the service provider computer system, matching a dining transaction ticket stored in a point-of-sale (POS) computer of a restaurant to the table number of the reservation record, based upon obtaining one or more POS data values from the POS computer, and obtaining ticket data specifying one or more items in the transaction ticket, by requesting the POS computer to provide ticket data for a transaction ticket of the POS computer having a POS table number that matches the location identifier in the reservation record; based upon the user identifier and a user account that associates the user identifier with a mobile computing device identifier, communicating the ticket data to a mobile computing device; receiving, from the mobile computing device, a request to pay a payment amount based upon the ticket data; requesting a payment gateway computer to initiate a payment transaction in which user payment account data associated with the user account identified as payer and in which a merchant account associated with the merchant is identified as beneficiary.

16. The method of clause 15 comprising: creating and storing a reservation completion time value in association with the reservation record at approximately a time of associating the table number; requesting the POS computer to provide ticket data for a transaction ticket of the POS computer having a ticket time value that is closest to the reservation completion time value.

17. The method of clause 16 wherein the reservation completion time value represents a seating time at which a party is seated at a table specified by the table number.

18. The method of clause 15 comprising: requesting the POS computer to provide ticket data for a transaction ticket of the POS computer having a POS table number that matches the table number in the reservation record; in response to failing to obtain ticket data for a transaction ticket of the POS computer having a POS table number that matches the table number in the reservation record, requesting the POS computer to provide ticket data for a transaction ticket of the POS computer having a ticket time value that is closest to the reservation completion time value of the reservation record; in response to failing to obtain ticket data for a transaction ticket of the POS computer having a ticket time value that is closest to the reservation completion time value of the reservation record, communicating to the mobile computing device a request to identify a particular table number.

19. The method of clause 15 comprising: receiving, from the mobile computing device, a device location value specifying a then-current geographic location of the mobile computing device; based on a stored location table that associates table numbers with item geographic location values, comparing the device location value to the item geographic location values and selecting a particular table number that is associated with a particular item geographic location value that is closest to the device location value; requesting the POS computer to provide ticket data for a transaction ticket of the POS computer having a POS table number that corresponds to the particular table number.

20. The method of clause 15 comprising: obtaining, from the payment gateway computer, a charge completion message specifying successful payment using a payment card number associated with the user account; creating and sending, to the mobile computing device, an electronic receipt that specifies at least a portion of the ticket data and the payment amount.

21. The method of clause 1, comprising: automatically receiving one or more ticket item updates from the POS computer in response to addition, in the POS computer, of one or more ticket items to the transaction ticket; in response to receiving one or more of the ticket item updates, sending the ticket item updates to the service provider computer system, wherein the service provider computer system performs the communicating, receiving and requesting as recited in clause 15.

22. The method of clause 21, comprising initiating an HTTP long polling request to the POS computer that specifies the transaction ticket and includes a request for the one or more ticket items.

23. The method of clause 15, comprising: receiving, from the mobile computing device, an acknowledgment of receiving the ticket data; in response to the acknowledgment, causing renaming the transaction ticket in the POS computer using a new name that indicates using mobile payment.

2. Structural and Functional Overview 2.1 Networked Computer System Example

FIG. 1 illustrates a networked computer environment in which an embodiment may be implemented. FIG. 1 represents one example embodiment that is provided for purposes of illustrating a clear example; other embodiments may use different arrangements.

In an embodiment, a plurality of mobile computing devices 102 is coupled using wireless links to a merchant local area network (LAN) 108 within the premises of a merchant. In this arrangement, the mobile computing devices 102 are communicatively coupled both directly to the merchant LAN 108 and indirectly to a public internetwork 120. In one embodiment, the merchant premises is a restaurant, but the techniques described herein also are usable in other contexts and use in dining or restaurant applications is not required. One or more other mobile computing devices 104 may be coupled wirelessly through a cellular network 106 to public internetwork 120. Merchant LAN 108 may be implemented using wired or wireless links, and may include a WAN gateway to other merchant sites, management centers or data centers. Network 120 broadly represents one or more LANs, WANs, and/or internetworks using any of wired, wireless, terrestrial, microwave or satellite links, and may include the public Internet.

Mobile computing devices 102, 104 of FIG. 1 broadly represent any of smartphones, tablet computers, other handheld computers, laptop computers, netbook computers, and ultrabook computers. Examples include IPHONE, IPAD or other APPLE IOS devices, ANDROID devices, and MICROSOFT WINDOWS devices. As shown for one mobile computing device 102, each of the devices 102, 104 may host or execute a booking-payment application ("app") 103, the functions of which are further described herein. In general, in the context of a restaurant, the app 103 is configured to receiving table booking data, display existing table bookings, facilitate searching for available tables, facilitate searching for data relating to restaurants, display an open check or completed check for a particular party and table at a particular restaurant, and/or facilitate authorizing payment of the check using a payment card or payment account.

Merchant LAN also may be coupled to a merchant booking computer 110 and a merchant point-of-sale (POS) computer 112. In an embodiment, merchant booking computer 110 hosts or executes a booking application 116 having payment logic 118. An example of a commercially available embodiment of the booking application 116 is the Electronic Reservation Book (ERB) of OpenTable, Inc., San Francisco, Calif. Functions of the booking application 116 and payment logic 118 are compatible with features of the booking-payment app 103, and are described further in other sections herein. In general, the booking application is configured to communicate with a compatible server-based booking service to receive data relating to online table bookings, and is configured to receive data indicating a table at which a party is seated. In general, payment logic 118 is configured to communicate table seating locations of seated parties to the booking application 132 and/or payment application 134 of the service provider computer system 130 to enable using those table locations as a basis to retrieve POS check data. In general, payment plug-in 114 is configured to receive and respond to requests of the server-based payment application 134 to interact with the merchant POS computer 112 to obtain check data, to modify or mark check data, and to interoperate with the server-based booking service to facilitate payment of checks.

In an embodiment, the merchant POS computer 112 is configured to perform point of sale functions such as, in the context of a restaurant, opening guest tickets or guest checks, entering orders for food, beverage or merchandise, revising or canceling orders, printing guest checks, associating guest checks with table numbers, and similar functions. Examples of commercially available merchant POS systems that can be used as computer 112 include MICROS and ALOHA. In an embodiment, the payment plug-in 114 is integrated with the merchant POS computer 112 and is configured to query the POS computer to obtain data requested in the requests, and to provide responses to the booking application with data responsive to the requests. In one approach, the payment plug-in 114 is POS-specific and is installed at the restaurant to process check viewing as well as check closing. Typically restaurants use a variety of POS systems. In an embodiment, POS plug-in program calls are abstracted into a set of generic calls so that the payment application 134 can be written using the generic calls without the need to communicate in a POS-specific manner. The generic calls communicate all messages and data between the service provider computer system 130 and payment plug-in 114 that are described herein, and at the plug-in, POS-specific libraries are configured to make POS-specific translations of requests, messages and data just before the requests are sent to the merchant POS computer 112. Similarly, the payment plug-in 114 is configured to transform responses and query results received from the merchant POS computer 112 to a generic format prior to communication to service provider computer system 130. As a result, the service provider computer system 130 can communicate with all restaurants at which a plug-in is installed to read as well as close checks.

In an embodiment, a service provider computer system 130 and a payment network gateway computer 140 also are coupled to network 120. In an embodiment, the service provider computer system 130 comprises one or more computers, virtual machine instances, and/or data centers that are configured to host or execute one or more instances of a booking application 132, payment application 134, and database 136. In some embodiments, booking application 132 may be integrated with the payment application 134 and separate units are not required.

In general, booking application 132 is configured to receive and reply to queries from booking-payment application 103 relating to available tables, restaurant details, menus, and similar data, to generate reminder messages, to provide booking data to booking application 116, and to provide booking data and/or data received from the booking application to the payment application 134. In general, the payment application 134 is configured to receive instructions from payment logic and/or booking-payment application 103 to pay the amount of a guest check and to initiate a payment transaction in a payment network by sending messages or instructions to payment network gateway computer 140. For purposes of clarity, the payment network gateway computer 140 broadly represents elements of a payment network without unnecessary details relating to accepting bank computers and other elements. A commercially available example of payment network gateway computer 140 is the STRIPE card payment system from Stripe, San Francisco, Calif.

In some embodiments, merchant LAN 108 may include or incorporate a firewall or other protective computing device that regulates the entry of messages, requests or command from computers that are on or outside of the public internetwork 120. As a result, typically the service provider computer system 130 cannot issue HTTP calls to the payment logic 118, payment plug-in 114, or other functional units of the merchant booking computer 110 and/or merchant POS computer 112. Therefore, in some embodiments, the elements of FIG. 1 are configured to use socket level third party protocols and messaging systems to communicate with the merchant POS computer 112 and other units that are behind firewalls. In one embodiment, HTTP long polling is used to implement a publish-subscribe mechanism. In this embodiment, payment plug-in 114, which resides on the merchant POS computer 112 within the restaurant firewall, subscribes to a channel that is hosted by a third-party server such as the service provider computer system 130. The booking application 132 and/or payment application 134 of computer system 130 sends messages to the in-restaurant POS plug-in 114 by publishing to this channel. Pubnub is an example of one third-party service providing this functionality.

For purposes of illustrating a clear example, FIG. 1 shows one or a limited number of each element that has been previously described, and practical embodiments or commercial implementations of the techniques herein may use many instances of various elements. For example, there may be thousands of merchant premises and each merchant premises may include many POS computer terminals coupled to one or more POS server computers. There may be thousands or millions of mobile computing devices 102, 104 distributed across the thousands of merchant premises.

The arrangement of FIG. 1 may implement a mobile payment solution that is integrated with a reservation making system to facilitate settlement of restaurant bills via a mobile device. In various embodiments as further described herein, diners using mobile computing devices 102, 104 can make reservations at restaurants such as the merchant premises of FIG. 1 using online portals provided via service provider computer system 130 such as OpenTable.com available, for instance, on the web or via the mobile application 103. In an embodiment, a mobile payment solution integrated with the reservation process as described herein can enable a diner to settle the restaurant bill directly from the application 103, potentially without requiring any interaction with the restaurant staff. In an embodiment, one or more of the app 103, booking application 116, and booking application 132 may obtain all data necessary to identify the diner and the diner's check. The disclosure provides an end-to-end data flow that introduces a novel payment experience generally beginning with an online reservation and ending with a settled restaurant bill, all experienced from within the mobile application 103.

Figure 2:
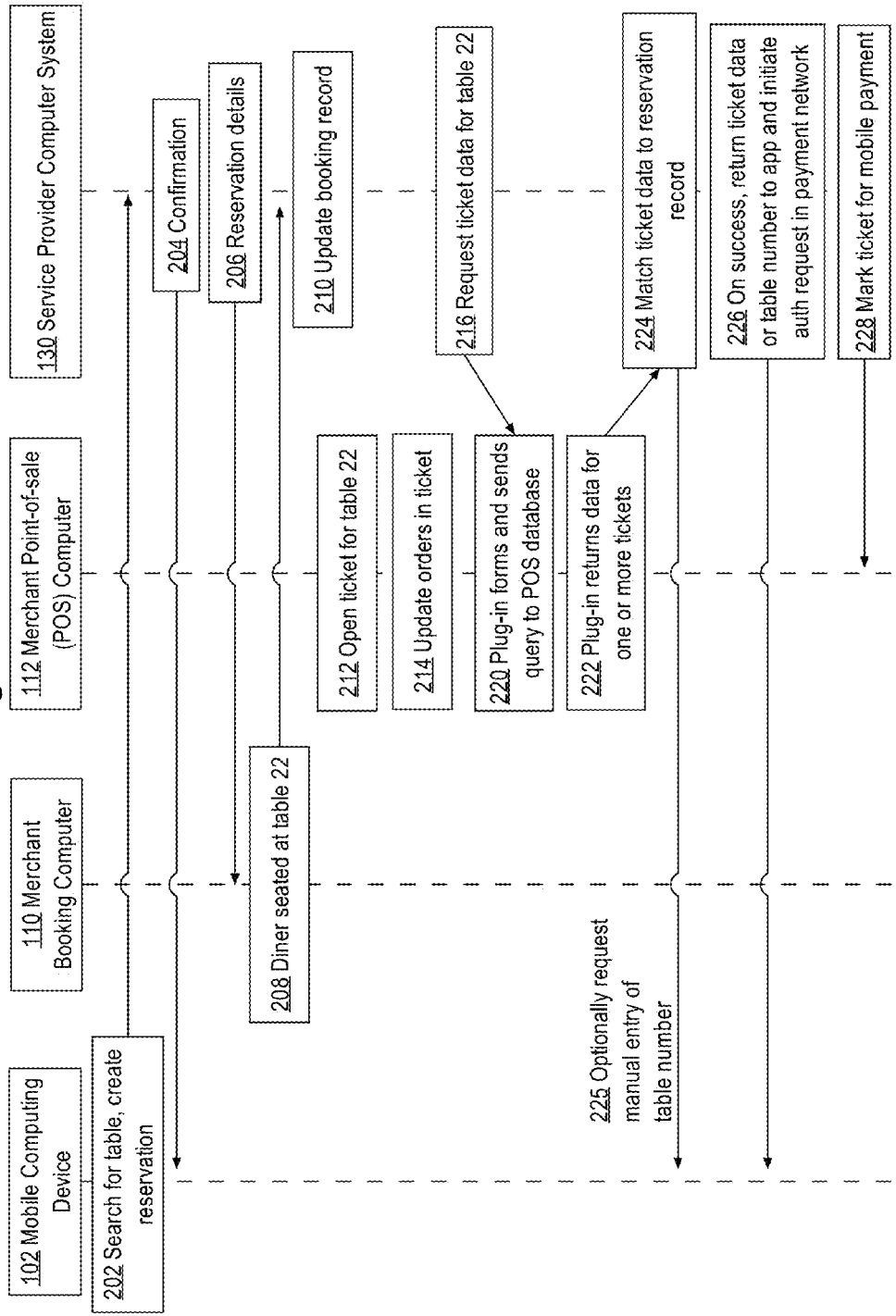
FIG. 2 illustrates data messages that may be communicated between a mobile computing device, merchant booking computer, merchant POS computer, and service provider computer to perform certain techniques including payment using the mobile device.
Figure 3:
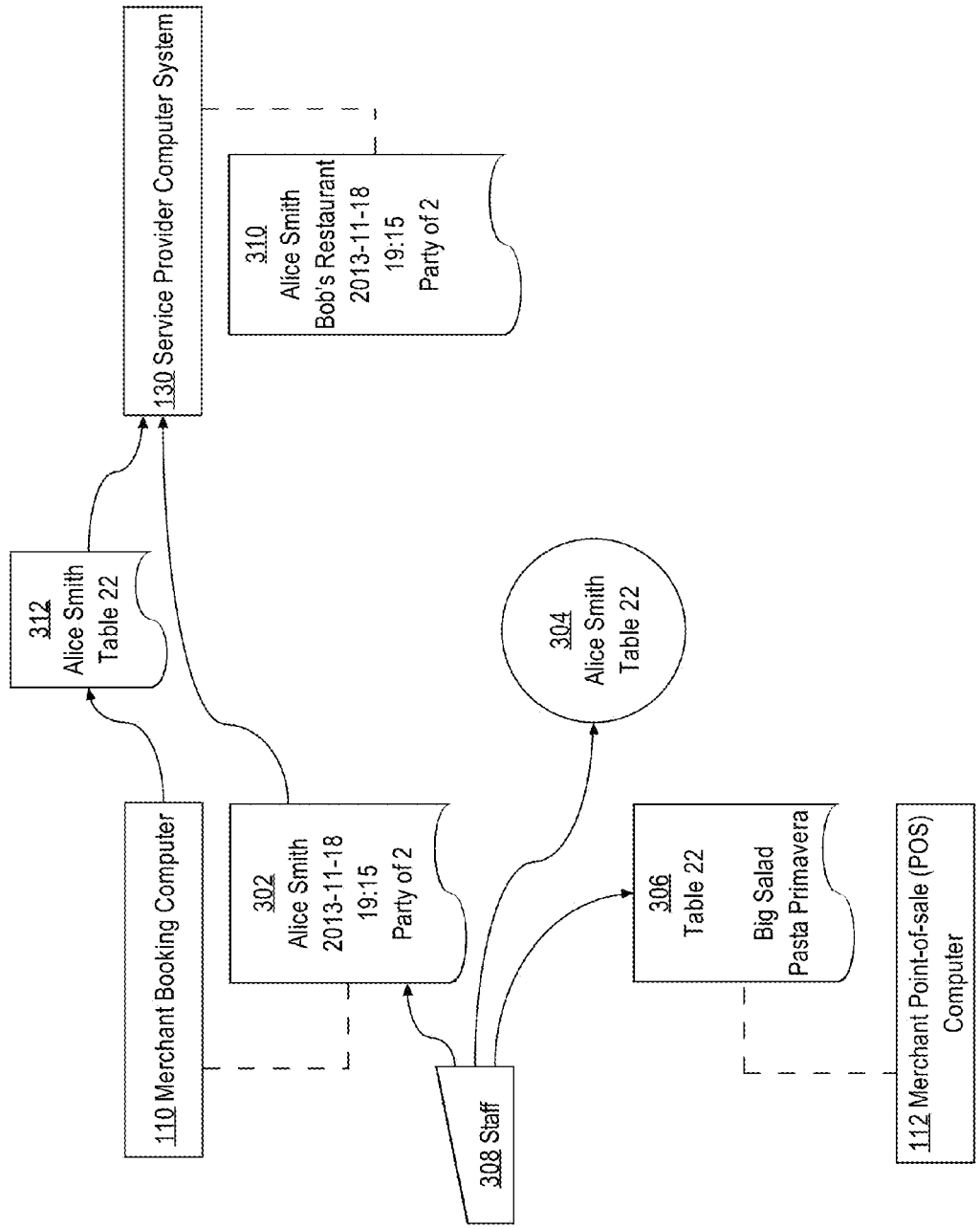
FIG. 3 illustrates mappings of reservation records, guest checks and database records in one embodiment

2.2 Example Dining Transaction with Automatic Mapping of a Ticket on a Restaurant POS System to a Payment Enabled Diner's Reservation FIG. 2 illustrates data messages that may be communicated between a mobile computing device, merchant booking computer, merchant POS computer, and service provider computer to perform certain techniques including payment using the mobile device. FIG. 3 illustrates mappings of reservation records, guest checks and database records in one embodiment.

For purposes of illustrating a clear example, in the context of restaurants and diners, assume that a mobile computing device 102 is associated with a diner. Referring first to FIG. 2, at block 202, the mobile computing device searches for a table and creates a reservation. For example, using mobile app 103, or using a web browser with another computing device, the diner establishes a data connection to service provider computer system 130 and searches database 136 for an available table at a restaurant in a particular location and completes a reservation record to result in booking a table for a meal. Assume, for purposes of an example, that a diner named Alice Smith books a table at Bob's Restaurant on Nov. 18, 2013 at 19:15 for a party of 2. As a result, service provider computer system 130 creates and stores record 310 (FIG. 3) that associates Alice Smith, Bob's Restaurant, 2013-11-18, 19:15, and a party of 2. In an embodiment, the service provider computer system 130 may send a confirmation message at block 204 to the mobile computing device 102. At block 206, the service provider computer system 130 also sends a copy of the reservation record with reservation details to Bob's Restaurant, and as a result the merchant booking computer 110 at Bob's creates and stores a record 302 with the same data, except that the restaurant name may be omitted in the record at Bob's.

Around the time of the reservation, the diner arrives at the merchant premises. Restaurant staff selects a table and seat the diner at the table; assume for this example that Alice's party is seated at table 22 as shown by circle 304. Typically the restaurant staff 308 uses the merchant booking computer 110 to determine which table to use for seating, and as seen at block 208, when the diner is seated, the merchant booking computer forms and sends a message 312 (FIG. 3) to the service provider computer system 130 providing the table number in association with user identification information specifying the diner. In an embodiment, payment logic 118 may report a table number to the service provider computer system 130, to any of the booking application 132 or payment application 134.

In response, at block 210 the service provider computer system 130 updates record 310 to include the table number. The staff typically also separately will create a new customer ticket or check 306 using the merchant POS computer 112, as seen at block 212, and specify the table number. At this point, the service provider computer system 130 has associated user identifying information for the diner and a table number that was received from the merchant booking computer, and the merchant POS computer is storing a ticket or check number in association with a table number but without data identifying the diner. In some embodiments, the record at system 130 for Alice Smith may be marked as unpaid or open for payment.

Assume now that Alice Smith orders the Big Salad and her companion orders Pasta Primavera; the restaurant staff enters the order only in the merchant POS computer 112, and the check 306 in the POS computer is updated with the order at block 214. In an embodiment, service provider computer system 130 is configured to regularly poll, request or otherwise obtain information from the POS computer 112 about tickets that are created or updated. Regular or periodic polling or requesting is not required, but may be performed. Alternatively, requests for ticket data may occur in response to specified operations or events. In an embodiment, at block 216 the service provider computer system 130 sends a request for ticket data for table 22 to plug-in 114 at the merchant POS computer 112. Table 22 is included because the record for Alice Smith is marked as unpaid at system 130. At this point, the service provider computer 130 uses table 22 as the table number because it received that table number via block 208, but the table number is not considered authoritative because the dining party could have been moved to a different table and/or the ticket opened at block 212 may reflect a different table number in the merchant POS computer 112.

In response, at block 220 the payment plug-in 114 forms and sends a query to the database of the merchant POS computer 112 to obtain all data then currently stored in any ticket for table 22. Data obtained from the POS computer 112 can include, but is not limited to, the reservation time, the time the ticket has been created, the table at which the diner has been seated and the party size.

The merchant POS computer 112 may reply to the query with zero or more tickets with associated data, as seen at block 222. For example, the merchant POS computer 112 may determine that there are zero, one, or more than one ticket having table 22 specified as the table number. There could be zero tickets for table 22 if the query is received before restaurant staff created a ticket for that table. There could be one ticket for table 22 if Alice Smith was the first party seated at table 22 during the business day, and/or if the merchant POS computer 112 supports both ticket opening and ticket closing functions. There could be two or more tickets for table 22 if Alice Smith was not the first party seated at table 22 during the business day and the merchant POS computer 112 does not support the concept of closing tickets. In such systems, multiple tickets with unique ticket numbers but the same table number could be available in the system at any one time. In some cases, message 312 may have contained an erroneous table number.

In an embodiment, the information received from the merchant booking computer 110 via block 208 and the POS computer 112 via block 222 is analyzed to find a match between a diner and a ticket so as to allow the diner to pay the ticket via the mobile payment system as further described herein. At block 224, the service provider computer system 130 matches the ticket data received from the merchant POS computer 112 to a reservation record. Matching may be performed using any of several different approaches.

1. If the merchant POS computer 112 returns ticket data for a single ticket having a table number that matches the table number of interest at the service provider computer system 130 (for example, table 22 of Alice Smith), then the service provider computer system may determine that the single ticket data matches, and the ticket number of the single matching ticket may be used for all subsequent queries to the merchant POS computer.

2. If the merchant POS computer 112 returns ticket data for two or more tickets having a table number that matches the table number of interest at the service provider computer system 130, then the service provider computer system may compare a timestamp value received as part of each ticket data to the time at which a party was seated at the table of interest and may select the ticket with the closest matching time. For example, if the record 302 at the merchant booking computer 110 has a seatingTime value of 19:17, a first ticket 306 from the merchant POS computer 112 has a creation time of 19:20 and a second ticket from the merchant POS computer has a creation time of 18:02, then the service provider computer system 130 may select the first ticket as matching and use its ticket number in subsequent queries. The same approach may be used if the ticket data received from the merchant POS computer does not include a table number that matches any table number in record 302.

3. If the merchant POS computer 112 returns an error, or reports that no ticket is associated with the table number in the query, then in one embodiment, block 224 or other functional blocks may comprise the service provider computer system 130 generating and sending a message to the mobile computing device 102 that prompts the user to enter a number of the table at which the user was seated, as seen at arrow 225. Thus, in an embodiment, the process of FIG. 2A may be configured to support automated as well as manual ticket-matching options in restaurant mobile payment solution app. As described for block 224, the mobile payment solution attempts automatically to map a diner with a ticket that is created on the merchant POS computer 112, using various pieces of data from the merchant booking computer 110 as well as the POS computer to automatically find the check for the diner. If successful, the diner is automatically notified about the check. If unable to find the check automatically, the application falls back on asking the diner to manually enter the table number at which he or she is seated and the merchant booking computer 110 then may retrieve check data from the POS computer 112 using a query that includes the table number. This approach ensures that failing the success of the heuristic-based check matching algorithm, the diner still has the option to pay for the meal via the mobile payment solution.

In some cases the data received via block 222 may contain complete order line items for food and beverage or other products or services identified in the ticket, and in some embodiments the data may consist only of ticket metadata such as ticket number, table number, and party size. Accordingly, using zero or more other messages and queries to the merchant POS computer 112 based on the matched or entered table number or ticket number, the service provider computer system 130 may obtain order items or other ticket data for the matching ticket and the data may be stored at the service provider computer in association with the reservation record of the user. Alternatively, an error message may be returned and manual table entry may be performed as noted above, followed by obtaining order line item detail using the manually entered table number as a key for queries.

At block 226, if the matching operation was successful then the service provider computer 130 may return the ticket data, or just the table number, to the mobile computing device 102 and the mobile app 103 may generate an updated display to signal the diner that ticket details were obtained and can be viewed on the mobile device. Further, in one embodiment, block 226 involves automatically initiating a payment authorization operation via the payment network gateway computer 140 in an amount equal to the maximum expected check amount for the restaurant or table. The authorization operation may form part of a two-part authorization/charge transaction that is conventionally used for payment card transactions using digital communications. The authorization amount may vary from merchant to merchant, and could be based upon the nature of the merchant, the size of the table, or other factors. For example, if the merchant is a "fast casual" restaurant and the table is a two-top, then the authorization amount might be $100, whereas if the merchant is a fine-dining restaurant and the table is a four-top, then the authorization amount might be $500.

In an embodiment, block 228 comprises the service provider computer 130 instructing the merchant POS computer 112 to mark the ticket as designated for mobile payment. In one embodiment, service provider computer system 130 may instruct the payment plug-in 114 at merchant POS computer 112 to mark the ticket in the merchant POS system as designated for mobile payment. In some embodiments, marking a ticket may comprise the payment plug-in 114 issuing a command to rename the ticket in the merchant POS computer 112 with a distinctive name that indicates that mobile payment will be used.

In an embodiment, block 228 or other operations also may comprise providing user interface feedback within merchant POS terminals that are coupled to the merchant POS computer 112 to indicate that the check will be paid using the mobile payment solution. In one embodiment, the solution herein is configured to obviate the need for a diner to require a waiter's attention or time in order to settle the check. In a typical case, as soon as the diner is done with the meal, the diner can settle the check at the restaurant with a click of a button in the mobile app 103, as further described herein, and leave the premises. As a consequence, service staff in restaurants may see that a diner eats and leaves without the waiter having been summoned at all to produce the check. For the waiter to know that a particular diner will pay using the mobile app 103, the diner's table's check on the merchant POS computer 112 may be modified as diner has committed to paying the check with the mobile app 103. In various embodiments, modification of the check in the merchant POS computer 112 may comprise renaming the check using a distinctive name, highlighting the check in a GUI display of the merchant POS computer 112 or a terminal using a distinctive color, highlighting treatment, or other indication, or displaying a distinctive logo or trademark on the check's icon.

In some embodiments, the service staff also may use one or more specialized buttons configured in the GUI of the POS terminal which when selected cause listing checks that are currently checked into by diners using the mobile app 103 for payment as well as checks that were recently paid using the mobile app and/or perform other functions. In some embodiments, a console to enable restaurants to view and initiate the payment process for a check may be provided.

In one embodiment, the payment plug-in 114 is configured to cause merchant POS computer 112 to generate and display a graphical button on the console for a check which when selected initiates the payment process to claim payment for the check. Using this function, service staff at the restaurant can cause the merchant POS computer 112 to communicate via the plug-in 114 with the service provider computer system 130 and mobile app 103 to close out the transaction with the diner's pre-selected credit card and pre-selected tip-amount. In some embodiments, the foregoing function may involve the service provider computer system 130 sending an encrypted or otherwise secured copy of payment card details to the merchant POS computer 112 via the plug-in 114 to permit the restaurant to charge the card for the ticket total amount using the restaurant's own payment networks. In other embodiments, the foregoing function may involve the service provider computer system 130 initiating a payment transaction via payment gateway computer 140 as described in connection with FIG. 4.

In an embodiment, the payment plug-in 114 is configured to cause merchant POS computer 112 to generate and display a graphical button which when selected causes listing for the server all the tables and checks that are then currently marked in the merchant POS computer as designated for mobile payment. For example, this function may involve the payment plug-in 114 generating a query to obtain ticket data for all tickets that are marked for mobile payment in the merchant POS computer 112, then instructing the merchant POS computer to display the list in a pop-up window or other GUI widget.

In an embodiment, the payment plug-in 114 is configured to cause merchant POS computer 112 to generate and display a graphical button which when selected causes listing details of checks that have recently been closed using mobile payment as described herein. For example, this function may involve the payment plug-in 114 generating a query to obtain ticket data for all tickets that are marked for mobile payment in the merchant POS computer 112 and that have a zero balance or are otherwise marked as paid or closed, then instructing the merchant POS computer to display the list in a pop-up window or other GUI widget.

In some embodiments, after block 228, the process is configured to periodically automatically update the ticket data at the mobile computing device in real time as long as the user has not initiated a payment transaction for the ticket. In effect, the process establishes a logical link between a diner's check as maintained in the merchant POS computer 112 and as maintained in the service provider computer system 130 and shown and/or managed via the mobile app 103. In one embodiment, the payment plug-in 114 comprises an updating module that continuously periodically polls the merchant POS computer 112 to retrieve any updates to checks that are known to be associated with the mobile payment solution. Periodic queries from the payment plug-in 114 to the merchant POS computer 112, based upon table numbers or ticket numbers that have been marked for mobile payment, may be used.

In an embodiment, database 136 continually reflects associations of account-holders of the service provider associated with service provider computer 130, restaurant identifiers, table numbers and check numbers for which account-holders have indicated that mobile payment will be used. On any modification to a check that has been marked for mobile payment, the updating module of the payment plug-in 114 publishes the updated check to the publish-subscribe channel, for which a key value has been pre-established with the mobile app 103. The mobile app 103 periodically polls the channel to obtain updates that match the key maintained in the mobile app for the current user. In response, the user interface of the mobile app 103 is updated to show new line items for food, beverage, or other products or services of the merchant that were added to the check.

Therefore, unlike prior approaches in which the diner only receives the complete check at the end of a meal, the diner is kept informed on a mobile computing device, in real time, of any modifications made to the check and the diner can view the current contents of the diner's guest check at any time using the mobile app 103. As a result, the diner can detect errors in the check as they occur, or learn that a particular order item was not entered and therefore has not been communicated to the kitchen, or monitor the ongoing increasing total amount of the check for budgeting purposes.

2.3 Restaurant Payment Processing Using a Third Party Marketplace Payment Gateway In an embodiment, the mobile payment solution is configured to enable a diner to transfer funds from the diner to the restaurant. In one embodiment, the funds are transferred from a diner's credit or debit card to the restaurant's bank account. For example, in one arrangement the system uses a third party marketplace payment gateway, such as the Stripe Connect system, to charge a diner's credit or debit card on behalf of the restaurant, thereby directly transferring the funds from the payment card into the restaurant's bank account. The money that is transferred into the restaurant's bank account does not travel to or through an account associated with the service provider computer 130. Instead, the service provider computer 130 communicates with other elements of the system to determine when a diner's guest check should be paid, to determine the amount, to receive authorization for payment, and to instruct the third party payment gateway to initiate a payment transaction for the benefit of the restaurant.

Figure 4:
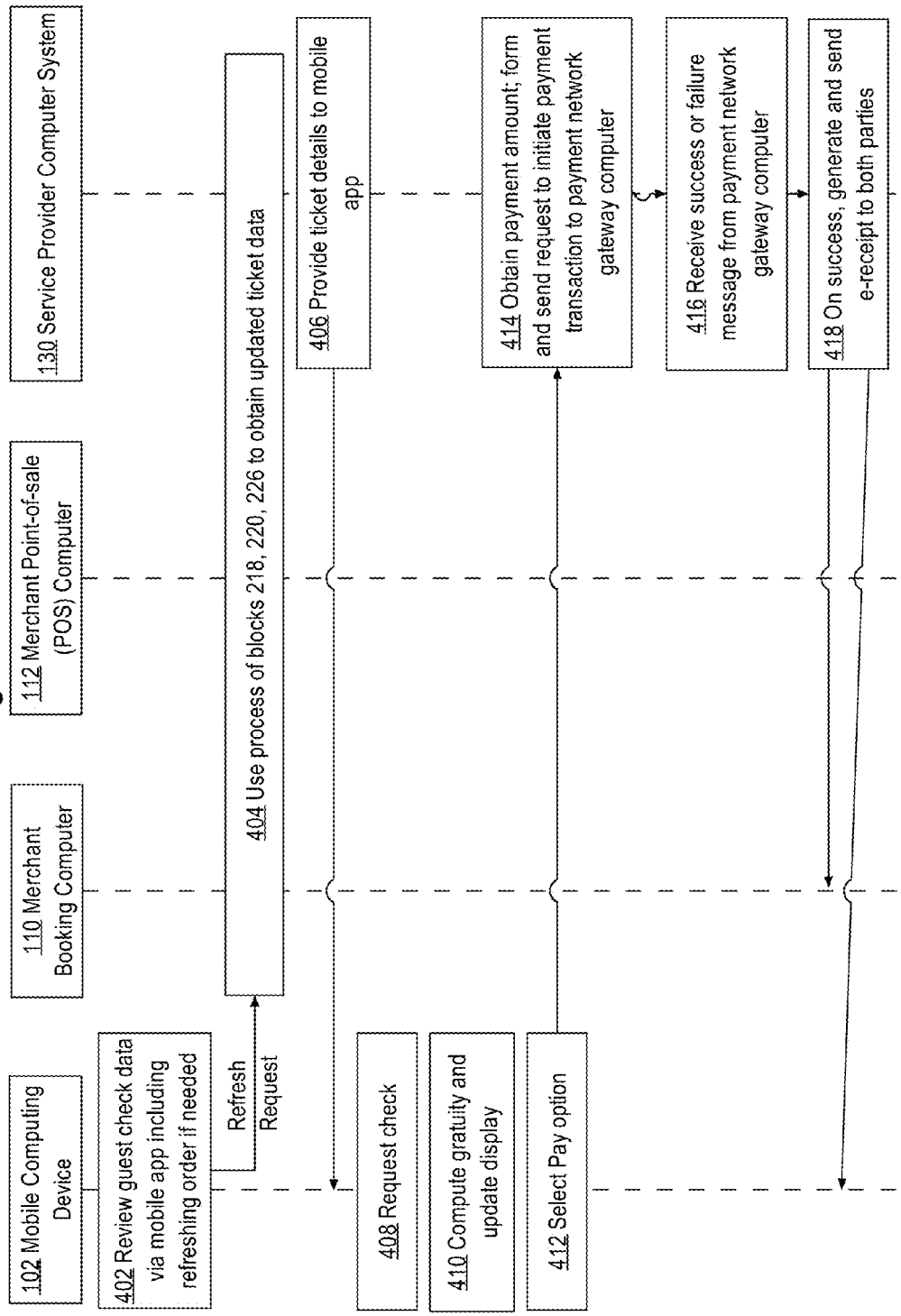
FIG. 4 is a message flow diagram that illustrates an example process for enabling a diner to transfer funds from the diner to a merchant such as a restaurant.

FIG. 4 is a message flow diagram that illustrates an example process for enabling a diner to transfer funds from the diner to a merchant such as a restaurant. At block 402, the mobile computing device 102 reviews guest check data via the mobile app 103, including refreshing order details if needed. Block 402 broadly represents obtaining and displaying ticket data such as order line items on the display screen of the mobile computing device, receiving a user selection of a refresh function, and initiating a refresh request if needed. A refresh request is appropriate, for example, if the party has ordered other menu items, beverages, or other products or services of the merchant after receiving an earlier display of the ticket details.

If a refresh request is made, as shown in block 404, the process previously described for FIG. 2 may be used to interact with the merchant POS computer 112 and/or service provider computer 130 to locate a matching ticket, obtain updated ticket details from the POS computer and update the service provider computer system with the ticket details. In general, block 404 represents interacting with the merchant POS computer 112 to obtain the then-current contents of a ticket for the table at which the mobile computing device 102 is located. At block 406, the updated ticket details are returned from the service provider computer system 130 over the network to the mobile computing device 102.

At block 408, a check request function is invoked. For example, a user of the mobile computing device 102 selects a Request Check function in the display of the mobile app 103. In response, at block 410, the mobile app 103 may locally compute a gratuity and total for the ticket and may update the display to show the ticket total, tax, gratuity, and other details.

At block 412, a payment option is invoked. For example, a user of the mobile computing device 102 selects a Pay function in the display of the mobile app 103. In response, the mobile computing device 102 forms and sends a request to pay the ticket or check to the service provider computer 130 and provides the total payment amount based upon locally computing the ticket total, tax, gratuity, etc. Further, at block 414, the service provider computer 130 obtains the payment amount, and forms and sends a request to initiate a payment of the total amount to the payment network gateway computer 140 (FIG. 1).

Although the specific format of the request of block 414 may vary in various embodiments based upon protocols or requirements implemented at the payment network gateway computer 140, in general the request specifies the payment amount, a payment card number associated with the mobile computing device 102, and a beneficiary account number associated with the merchant. In some embodiments, the payment card number of a user of the mobile computing device and the beneficiary account number of the merchant are stored in database 136, but other storage may be used in different embodiments. For example, the mobile computing device 102 could store the payment card number of the user at the mobile computing device and could provide the payment card number, typically in an encrypted or otherwise secure format, as part of the message linking blocks 412, 414. In another embodiment, the user of the mobile computing device 102 may establish an account with the payment network gateway computer 140 based upon a user name, password or other secure credentials and store the user's payment card details in records in the payment network gateway computer. In this variation, the mobile app 103 would be configured with a reference to the payment network gateway computer 140 and the user credentials, and the message linking blocks 412, 414 could specify the user credentials.

In an embodiment, at block 416, a success or failure message is received from the payment network gateway computer 140 at the service provider computer system 130. Operations performed in response to a failure of the payment transaction are not critical and may vary in various embodiments. If the payment transaction was successful, then at block 418, an electronic receipt is generated and communicated both to the merchant POS computer 112 and to the mobile computing device 102. For example, the e-receipt may be sent to the payment plug-in 114 and then communicated from the plug-in to the merchant POS computer 112 using an appropriate request or message. Concurrently the e-receipt is sent over the network to the mobile app 103.

Using this approach, once the diner has paid for the check, the diner receives an email with a receipt similar in format to the printed receipt that would have been received at the restaurant if any other payment tender medium had been used. In some embodiments, mobile app 103 may be configured to enable a diner to view a log of all payment transactions made via the app and to select and generate email messages to which receipts for past transactions are attached. Further, the restaurant manager may receive the same receipt data via plug-in 114 and merchant POS computer 112. As a result, the diner and the restaurant have the identical receipt which can be used in case of contesting or disputing erroneous charges; the diner can print and file the receipt like a regular paper receipt from a restaurant; the diner could send the soft copy, or print out and submit soft copies that the diner might need for filing expenses or claiming reimbursements; and the merchant receives a document that may be used in auditing operations, to confirm calculations and distributions of tips to staff, or for other accounting purposes. Thus, embodiments may be configured for maintaining mobile payment transaction history with the ability to generate and email records and receipts for past transactions.

Using this approach, in an embodiment, a restaurant mobile payment solution may be integrated with an application program that is configured to provide reservation-making and viewing functions in the same app. For example, in an embodiment, the mobile app 103 is configured to provide reservation-making functions of the type commercially available at the time of this writing in the OpenTable smart phone application from OpenTable, Inc., San Francisco, Calif. Unlike prior approaches, in an embodiment, a mobile payment solution is integrated into the application to provide users with a novel solution that both allows them to make reservations at a restaurant as well as pay for that reservation. This obviates the need for users to have to download separate applications for the purposes of making a reservation and for paying for that reservation.

FIG. 5A illustrates a first example screen display that the mobile app may generate on a mobile computing device. A screen display 502 comprises an account pane 504, an order region 506 and a check request button 508. In some embodiments, screen display 502 may be displayed in response to the success indication of block 226 (FIG. 2); thus, the screen display of FIG. 5A may indicate to the user of the mobile computing device 102 that the matching operation of block 224 was successful and that ticket data for the table was obtained.

In an embodiment, the account pane 504 displays a name and image associated with an account that is then currently logged in using the mobile app 103 to the booking application 132 of the service provider computer system 130. In an embodiment, the account pane 504 also may display a part or all of account information for a payment card that is then currently configured in the mobile app 103 for purposes of processing payments of the account owner at restaurants with which the mobile app is used.

In an embodiment, the order region 506 displays one or more line items that identify food, beverage or other items that the account owner or other members of the party have ordered at the restaurant. Line items shown as examples in FIG. 5A are "Pork Nachos" and "Single Chicken Taco". The line items reflect data that was obtained from the merchant POS computer 110 and associated with a ticket for the table number that is indicated in the screen display 502. The order region 506 also may display a name of the server assigned to the table, "Cowans C" in this example, which also may be obtained from the merchant POS computer 110 in some embodiments.

Optionally, in one embodiment, screen display 502 may comprise a prompt message 505 that suggests to the account owner or other user of the mobile computing device 102 that the server of the table may be informed that the party will use the mobile app 103 and other elements of the system herein for purposes of payment. In one embodiment, mobile app 103 is configured to display the prompt message 505 in response to initial launching or opening of the mobile app on the mobile computing device.

In an embodiment, selecting the check request button 508 causes the mobile app 103 to form and send a message to the service provider computer system 130. Operations that occur in response are described further in other sections herein.

FIG. 5B illustrates a second example screen display that the mobile app may generate on a mobile computing device. As seen in FIG. 5B, in an embodiment the prompt message 505 of FIG. 5A may be omitted at times other than initially opening the mobile app 103. Further, the order region 506 may comprise first and second line items each of which may have respective approval icons 512, 510 comprising user-selectable widgets. In an embodiment, selecting a particular approval icon 510 signals the mobile app 103 that the user of the mobile app likes or approves of the particular line item, and the mobile app may be configured to form and send a message to the service provider computer system 130 indicating the selection. Thereafter, as further described herein, the service provider computer system 130 can generate one or more reports that provide analytical data about the favorite menu items of a large number of diners, items that were ordered together, and so forth.

Figure 5D:
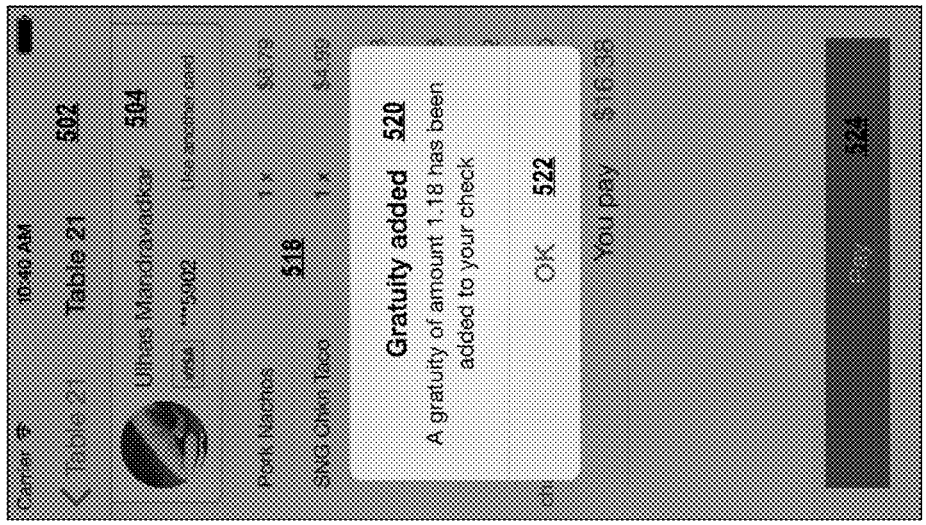
Figure 5C:
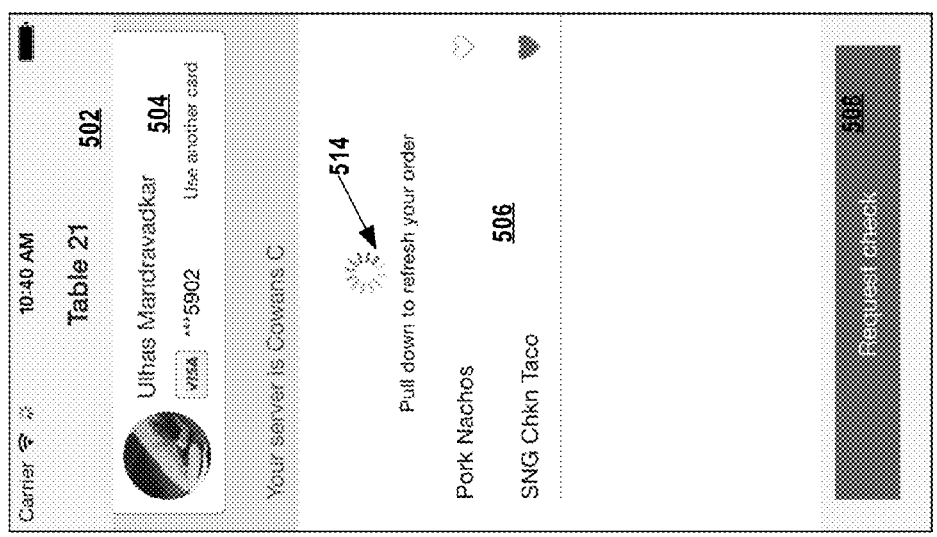

FIG. 5C illustrates a third example screen display that the mobile app may generate on a mobile computing device. In the example of FIG. 3, screen display 502 further comprises a refresh prompt message configured as "Pull down to refresh your order," and a refresh icon 514. In an embodiment, mobile app 103 is configured to respond to a user touch gesture in the form of dragging the order region 506 downward to cause updating the order region. In an embodiment, updating the order region 506 comprises the mobile app 103 generating and sending a message, via service provider computer system 130, to the booking application 116 and the payment plug-in 114, to initiate and send a new query to the merchant POS computer 112 to obtain then-current data associated with the ticket for the table. At this point in processing, the ticket number of the ticket associated with the table has been obtained in previous steps, and therefore the query for updated ticket details may include the ticket number.

FIG. 5D illustrates a fourth example screen display that the mobile app may generate on a mobile computing device. FIG. 5D illustrates a screen display that may be generated by the mobile app 103 in response to user selection of the check request button 508. In this embodiment, the order region 506 is updated to comprise a completed guest check region 518 in which order line items include quantities, prices, tax, other fees, and a guest check total amount. In an embodiment, a tip or gratuity is automatically computed based upon a specified gratuity rate and added to the guest check and shown I the completed guest check region 518. In an embodiment, screen display 502 is displayed in a de-emphasized format such as grayed-out, and a gratuity notification 520 is displayed to indicate the gratuity amount that was added. Notification 520 may include an acknowledgment button 522 that is configured to dismiss the notification from the screen display in response to selection of the button.

The gratuity rate may be specified in configuration data, in a default value, and/or through aspects of the user interface that the mobile app 103 provides.

Figure 5F:
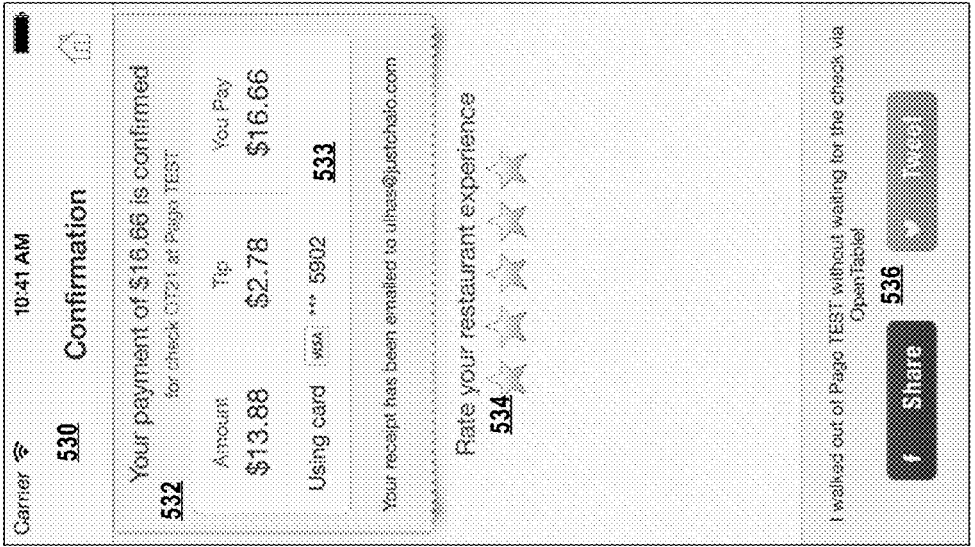
Figure 5E:
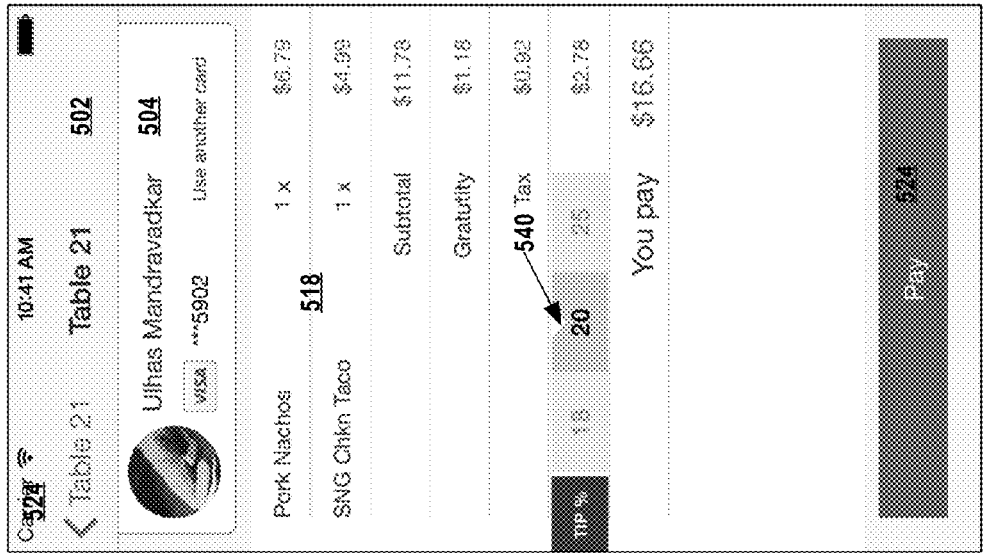

FIG. 5E illustrates a fifth example screen display that the mobile app may generate on a mobile computing device. In an embodiment, in response to dismissing the notification 520, the screen display 502 of FIG. 5E is displayed with the completed guest check region 518. In an embodiment, the completed guest check region 518 comprises a gratuity selection region 540 that is configured as a plurality of available gratuity rate value blocks, expressed as percentages of the total check amount, where each of the rate value blocks is a selectable GUI widget. In the example of FIG. 5E, available gratuity rates include 18%, 20%, and 25% of the check total; other embodiments may display other gratuity rates, based on configuration data or hard-coded default values in mobile app 103, according to local customs or practices. In an embodiment, selecting one of the gratuity selection regions 540 causes redisplaying screen display 502 in a form in which the newly selected gratuity rate is highlighted and the values in completed guest check region 518 are recalculated using the new gratuity rate.

FIG. 5D, 5E further comprise a pay button 524 configured as a selectable GUI widget. In an embodiment, selecting the pay button 524 causes the mobile app 103 to form and send a message to the service provider computer system 130 requesting initiation of a payment transaction. In response, the payment application 134 forms and sends a message to the payment gateway computer 140 requesting initiation of a payment transaction and providing the guest check amount, payment card information for the payment card that is currently configured for the user, and a beneficiary account for the restaurant. The beneficiary account number may be configured in database 136 at the time that a restaurant is enrolled for service in the service provider computer system 130.

FIG. 5F illustrates a sixth example screen display that the mobile app may generate on a mobile computing device. In an embodiment, a confirmation screen display 530 of FIG. 5F is displayed in response to selecting the pay button 524 and successfully performing a payment transaction. In one embodiment, confirmation screen display 530 comprises a confirmation notification 532 that specifies a confirmed payment amount, a check number, a restaurant identifier, and an e-mail address to which a confirmed receipt has been sent. One or more of the values may be omitted or changed in different embodiments.

In an embodiment, notification 532 further comprises a charge summary region 533 that presents the guest check amount, tip amount, total amount, and some or all of the account number that was charged. Values shown in summary region 533 may vary in different embodiments.

Further, in some embodiments a rating panel 534 is displayed in confirmation screen display 530 and prompts the user to rate the user's experience at the restaurant that was just patronized. Selecting a particular rating value icon, such as a star, in the rating panel 534 causes transmitting a corresponding rating value to the service provider computer 130, and in response, the booking application 132 may update rating values for the restaurant that are stored in database 136.

FIG. 5G illustrates a seventh example screen display that the mobile app may generate on a mobile computing device.

In an embodiment, mobile app 103 is configured to provide one or more configuration functions that are accessible by selecting a Settings icon, and in response, a configuration screen display 540 is generated and displayed. In one embodiment, a Tip function 542 and Cards function 544 are displayed in selectable panels.

FIG. 5H illustrates an eighth example screen display that the mobile app may generate on a mobile computing device in response to selection of the Tip function 542 of FIG. 5G. In an embodiment, a Manage tip screen display 550 comprises a gratuity selection region 552 that is configured as a plurality of available gratuity rate value blocks, expressed as percentages of the total check amount, where each of the rate value blocks is a selectable GUI widget. In the example of FIG. 5H, available gratuity rates include 15%, 18%, and 20% of the check total; other embodiments may display other gratuity rates, based on configuration data or hard-coded default values in mobile app 103, according to local customs or practices. In an embodiment, selecting one of the blocks in gratuity selection regions 552 causes storing the associated tip value in non-volatile memory associated with the mobile app 103 as a default value, which is then used in later calculations of the tip amount for guest checks.

FIG. 5J illustrates a ninth example screen display that the mobile app may generate on a mobile computing device in response to selection of the Cards function 544 (FIG. 5G). FIG. 5K illustrates a tenth example screen display that may be generated during entry of a card.

Referring first to FIG. 5J, in an embodiment, an Add Card screen display 560 is generated and comprises a name panel 562, a payment card account number panel 564, a prompt region 566, and a virtual keypad 568. In an embodiment, the name panel 562 is configured to display a name of an account that is associated with the payment card, typically a cardholder name as it appears in payment card account information of an issuing bank. The payment card account number panel 564 indicates some or all of the account number of a payment card that has been or is being configured for use for payment of later transactions. The prompt region 566 may comprise a message such as "Scan your card" that prompts the user to use a camera of the smartphone to capture an image of a payment card. The virtual keypad 568 is configured with touch-sensitive numeric digit blocks which when selected cause entering a payment card number in the number panel 564, as seen in FIG. 5K.

2.4 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
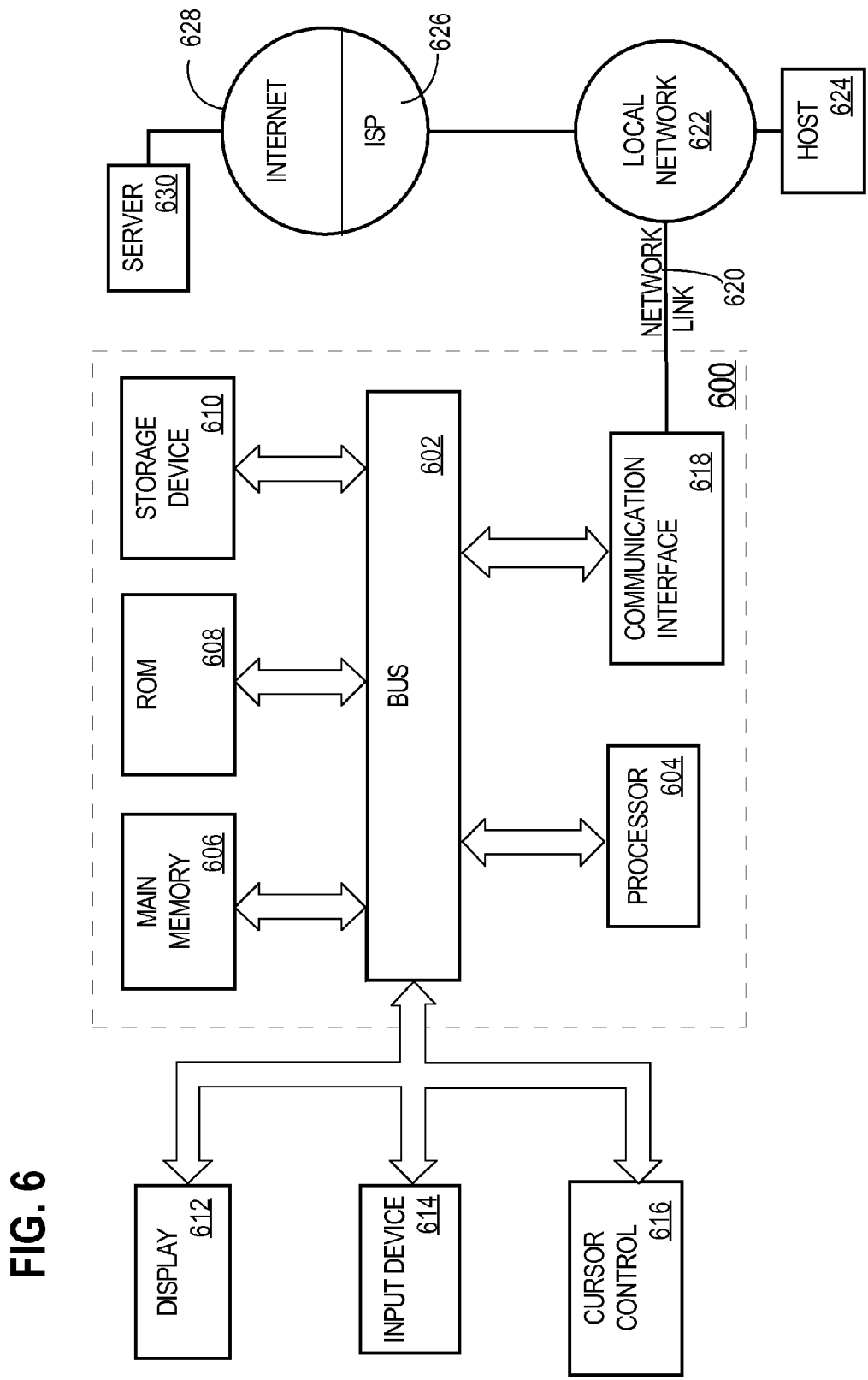
FIG. 6 is a block diagram that illustrates a computer system 600 upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

2.6 Interpretation of Terms

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the appended claims, any clause, element or limitation of a claim that does not include the words "means for" is not intended to invoke or to be construed under 35 U.S.C. §112 (f). In the appended claims, any clause, element or limitation that is expressed as a thing for performing or configured to perform a specified function without the recital of structure, material or acts in support thereof is intended to be construed to cover the corresponding structure, material or acts described in the specification, and any other structure, material or acts that were known or in use as of the priority date to which this patent document is entitled or reasonably foreseeable to those of ordinary skill in the art in view of the disclosure as a whole herein, and equivalents thereof.

What is claimed is:

1. A data processing method comprising:
using a merchant booking computer, associating a reservation record with a location identifier, wherein the reservation record comprises a user identifier;
using a service provider computer system, obtaining the location identifier, matching a transaction ticket stored in a point-of-sale (POS) computer of a merchant to the location identifier of the reservation record, based upon obtaining one or more POS data values from the POS computer, and obtaining ticket data specifying one or more items in the transaction ticket;
based upon the user identifier and a user account that associates the user identifier with a mobile computing device identifier, communicating the ticket data to a mobile computing device using the service provider computer system;
receiving, from the mobile computing device, a request to pay a payment amount based upon the ticket data;
requesting a payment gateway computer to initiate a payment transaction in which user payment account data associated with the user account identified as payer and in which a merchant account associated with the merchant is identified as beneficiary.

2. The method of claim 1 comprising requesting the POS computer to provide ticket data for a transaction ticket of the POS computer having a POS location identifier that matches the location identifier in the reservation record.

3. The method of claim 1 comprising:
creating and storing a reservation completion time value in association with the reservation record at approximately a time of associating the location identifier;
requesting the POS computer to provide ticket data for a transaction ticket of the POS computer having a ticket time value that is closest to the reservation completion time value.

4. The method of claim 3 wherein the reservation completion time value represents a seating time at which a party is seated at a table specified by the location identifier.

5. The method of claim 1 comprising:
using the service provider computer system, requesting the POS computer to provide ticket data for a transaction ticket of the POS computer having a POS location identifier that matches the location identifier in the reservation record;
in response to failing to obtain ticket data for a transaction ticket of the POS computer having a POS location identifier that matches the location identifier in the reservation record, requesting the POS computer to provide ticket data for a transaction ticket of the POS computer having a ticket time value that is closest to the reservation completion time value of the reservation record;

in response to failing to obtain ticket data for a transaction ticket of the POS computer having a ticket time value that is closest to the reservation completion time value of the reservation record, communicating to the mobile computing device a request to identify a location.

6. The method of claim 1 comprising:
receiving, from the mobile computing device, a device location value specifying a then-current geographic location of the mobile computing device;
based on a stored location table that associates location identifier values with item geographic location values, comparing the device location value to the item geographic location values and selecting a particular location identifier value that is associated with a particular item geographic location value that is closest to the device location value;
requesting the POS computer to provide ticket data for a transaction ticket of the POS computer having a POS location identifier that corresponds to the particular location identifier value.

7. The method of claim 1 wherein each of the location identifier and the POS location identifier specifies a table of a restaurant, and wherein the merchant is a restaurant.

8. The method of claim 1, comprising:
using a booking application of the service provider computer system, receiving a reservation confirmation message from a mobile computing device that confirms a reservation request for a restaurant reservation that comprised a restaurant name, date, time, and party size;
using the merchant booking computer: receiving from the reservation computer the date, time and party size of the restaurant reservation; storing the date, time and party size in association with the reservation record; communicating, to the reservation computer, the location identifier and the ticket data in association with the user identifier.

9. The method of claim 1 comprising:
obtaining, from the payment gateway computer, a charge completion message specifying successful payment using a payment card number associated with the user account;
creating and sending, to the mobile computing device, an electronic receipt that specifies at least a portion of the ticket data and the payment amount.

10. The method of claim 1, comprising:
automatically receiving one or more ticket item updates from the POS computer in response to addition, in the POS computer, of one or more ticket items to the transaction ticket;
in response to receiving one or more of the ticket item updates, sending the ticket item updates to a reservation computer, wherein the reservation computer performs the communicating, receiving and requesting as recited in claim 1.

11. The method of claim 10, comprising initiating an HTTP long polling request to the POS computer that specifies the transaction ticket and includes a request for the one or more ticket items.

12. The method of claim 1, comprising:
receiving, from the mobile computing device, an acknowledgment of receiving the ticket data;
in response to the acknowledgment, causing renaming the transaction ticket in the POS computer using a new name that indicates using mobile payment.

13. The method of claim 12, comprising causing the POS computer to display the new name.

14. The method of claim 12, comprising causing the POS computer to display the transaction ticket using a distinctive appearance that indicates using mobile payment.

15. A data processing method comprising:
using a booking application at a service provider computer system, receiving a reservation confirmation message from a mobile computing device that confirms a reservation request for a restaurant reservation that comprised a restaurant name, date, time, and party size;
using an electronic reservation book (ERB) computer, receiving from the service provider computer system the date, time and party size of the restaurant reservation;
storing the date, time and party size in association with a reservation record;
using the ERB computer, associating a reservation record with a table number, wherein the reservation record comprises a user identifier;
communicating, to the service provider computer system, the location identifier in association with the user identifier;
using the service provider computer system, matching a dining transaction ticket stored in a point-of-sale (POS) computer of a restaurant to the table number of the reservation record, based upon obtaining one or more POS data values from the POS computer, and obtaining ticket data specifying one or more items in the transaction ticket, by requesting the POS computer to provide ticket data for a transaction ticket of the POS computer having a POS table number that matches the location identifier in the reservation record;
based upon the user identifier and a user account that associates the user identifier with a mobile computing device identifier, communicating the ticket data to a mobile computing device using the service provider computer system;
receiving, from the mobile computing device, a request to pay a payment amount based upon the ticket data;
requesting a payment gateway computer to initiate a payment transaction in which user payment account data associated with the user account identified as payer and in which a merchant account associated with the merchant is identified as beneficiary.

16. The method of claim 15 comprising:
creating and storing a reservation completion time value in association with the reservation record at approximately a time of associating the table number;
requesting the POS computer to provide ticket data for a transaction ticket of the POS computer having a ticket time value that is closest to the reservation completion time value.

17. The method of claim 16 wherein the reservation completion time value represents a seating time at which a party is seated at a table specified by the table number.

18. The method of claim 15 comprising:
requesting the POS computer to provide ticket data for a transaction ticket of the POS computer having a POS table number that matches the table number in the reservation record;
in response to failing to obtain ticket data for a transaction ticket of the POS computer having a POS table number that matches the table number in the reservation record, requesting the POS computer to provide ticket data for a transaction ticket of the POS computer having a ticket time value that is closest to the reservation completion time value of the reservation record;

in response to failing to obtain ticket data for a transaction ticket of the POS computer having a ticket time value that is closest to the reservation completion time value of the reservation record, communicating to the mobile computing device a request to identify a particular table number.

19. The method of claim 15 comprising:
receiving, from the mobile computing device, a device location value specifying a then-current geographic location of the mobile computing device;
based on a stored location table that associates table numbers with item geographic location values, comparing the device location value to the item geographic location values and selecting a particular table number that is associated with a particular item geographic location value that is closest to the device location value;
requesting the POS computer to provide ticket data for a transaction ticket of the POS computer having a POS table number that corresponds to the particular table number.

20. The method of claim 15 comprising:
obtaining, from the payment gateway computer, a charge completion message specifying successful payment using a payment card number associated with the user account;
creating and sending, to the mobile computing device, an electronic receipt that specifies at least a portion of the ticket data and the payment amount.

21. The method of claim 15, comprising:
automatically receiving one or more ticket item updates from the POS computer in response to addition, in the POS computer, of one or more ticket items to the transaction ticket;
in response to receiving one or more of the ticket item updates, sending the ticket item updates to the service provider computer system, wherein the service provider computer system performs the communicating, receiving and requesting as recited in claim 15.

22. The method of claim 21, comprising initiating an HTTP long polling request to the POS computer that specifies the transaction ticket and includes a request for the one or more ticket items.

23. The method of claim 15, comprising:
receiving, from the mobile computing device, an acknowledgment of receiving the ticket data;
in response to the acknowledgment, causing renaming the transaction ticket in the POS computer using a new name that indicates using mobile payment.

24. One or more non-transitory computer-readable media storing instructions which, when executed by one or more processors, causes the one or more processors to perform a method comprising:
using a merchant booking computer, associating a reservation record with a location identifier, wherein the reservation record comprises a user identifier;
using a service provider computer system, obtaining the location identifier, matching a transaction ticket stored in a point-of-sale (POS) computer of a merchant to the location identifier of the reservation record, based upon obtaining one or more POS data values from the POS computer, and obtaining ticket data specifying one or more items in the transaction ticket;
based upon the user identifier and a user account that associates the user identifier with a mobile computing device identifier, communicating the ticket data to a mobile computing device using the service provider computer system;
receiving, from the mobile computing device, a request to pay a payment amount based upon the ticket data;
requesting a payment gateway computer to initiate a payment transaction in which user payment account data associated with the user account identified as payer and in which a merchant account associated with the merchant is identified as beneficiary.

25. The one or more non-transitory computer-readable media of claim 24, the method further comprising requesting the POS computer to provide ticket data for a transaction ticket of the POS computer having a POS location identifier that matches the location identifier in the reservation record.

26. The one or more non-transitory computer-readable media of claim 24, the method further comprising:
creating and storing a reservation completion time value in association with the reservation record at approximately a time of associating the location identifier;
requesting the POS computer to provide ticket data for a transaction ticket of the POS computer having a ticket time value that is closest to the reservation completion time value.

27. One or more non-transitory computer-readable media storing instructions which, when executed by one or more processors, causes the one or more processors to perform a method comprising:
using a booking application at a service provider computer system, receiving a reservation confirmation message from a mobile computing device that confirms a reservation request for a restaurant reservation that comprised a restaurant name, date, time, and party size;
using an electronic reservation book (ERB) computer, receiving from the service provider computer system the date, time and party size of the restaurant reservation;
storing the date, time and party size in association with a reservation record;
using the ERB computer, associating a reservation record with a table number, wherein the reservation record comprises a user identifier;
communicating, to the service provider computer system, the location identifier in association with the user identifier;
using the service provider computer system, matching a dining transaction ticket stored in a point-of-sale (POS) computer of a restaurant to the table number of the reservation record, based upon obtaining one or more POS data values from the POS computer, and obtaining ticket data specifying one or more items in the transaction ticket, by requesting the POS computer to provide ticket data for a transaction ticket of the POS computer having a POS table number that matches the location identifier in the reservation record;
based upon the user identifier and a user account that associates the user identifier with a mobile computing device identifier, communicating the ticket data to a mobile computing device using the service provider computer system;
receiving, from the mobile computing device, a request to pay a payment amount based upon the ticket data;
requesting a payment gateway computer to initiate a payment transaction in which user payment account data associated with the user account identified as payer and in which a merchant account associated with the merchant is identified as beneficiary.

28. The one or more non-transitory computer-readable media of claim 27, the method further comprising:

creating and storing a reservation completion time value in association with the reservation record at approximately a time of associating the table number;

requesting the POS computer to provide ticket data for a transaction ticket of the POS computer having a ticket time value that is closest to the reservation completion time value.

29. The one or more non-transitory computer-readable media of claim 28 wherein the reservation completion time value represents a seating time at which a party is seated at a table specified by the table number.

30. The one or more non-transitory computer-readable media of claim 27, the method further comprising:

requesting the POS computer to provide ticket data for a transaction ticket of the POS computer having a POS table number that matches the table number in the reservation record;

in response to failing to obtain ticket data for a transaction ticket of the POS computer having a POS table number that matches the table number in the reservation record, requesting the POS computer to provide ticket data for a transaction ticket of the POS computer having a ticket time value that is closest to the reservation completion time value of the reservation record;

in response to failing to obtain ticket data for a transaction ticket of the POS computer having a ticket time value that is closest to the reservation completion time value of the reservation record, communicating to the mobile computing device a request to identify a particular table number.

\* \* \* \* \*